United States Patent [19]

Koltookian

[11] Patent Number: 5,070,987

[45] Date of Patent: Dec. 10, 1991

[54] CONVEYOR BLADE STOP DEVICE

[75] Inventor: Sarkis A. Koltookian, Cedar Falls, Iowa

[73] Assignee: Deere & Company, Moline, Ill.

[21] Appl. No.: 648,508

[22] Filed: Jan. 30, 1991

[51] Int. Cl.$^5$ ............................................. B65G 37/00
[52] U.S. Cl. ................................. 198/368; 193/35 A; 198/463.4
[58] Field of Search ...................... 198/368, 463.4, 633; 193/35 A

[56] References Cited

U.S. PATENT DOCUMENTS

| 1,021,876 | 4/1912 | Lister | 198/463.4 X |
| 1,912,898 | 6/1933 | Jennings et al. | 198/463.4 X |
| 2,769,520 | 11/1956 | Davidson et al. | 198/463.4 |
| 3,724,642 | 4/1973 | DeGood | 198/780 |
| 3,777,867 | 12/1973 | Durwald | 193/35 A |
| 3,881,585 | 5/1975 | Coleman et al. | 193/35 A |
| 3,970,180 | 7/1976 | Schlottmann et al. | 193/35 A |
| 3,990,557 | 11/1976 | Carder | 193/35 A |
| 4,088,221 | 5/1978 | Bowser | 198/491 |
| 4,119,190 | 10/1978 | Kornylak | 193/35 A |
| 4,136,763 | 1/1979 | Pryor et al. | 198/368 X |
| 4,219,114 | 8/1980 | Kovacs | 198/780 |
| 4,289,229 | 9/1981 | Keller | 198/633 |
| 4,787,808 | 11/1988 | Shimoji et al. | 193/35 A X |

FOREIGN PATENT DOCUMENTS 1407887  7/1988  U.S.S.R. ........................... 198/463.4

Primary Examiner—Robert P. Olszewski
Assistant Examiner—James R. Bidwell

[57]  ABSTRACT

A pair of blade stop devices are attached to the sides of a part conveyor. Each blade stop device includes a stop member pivotally mounted on a frame member. The stop member is normally held by a spring in a stop position wherein it projects above the upper surface of the part conveyor. A cable/actuator mechanism is operable to pivot the stop member to a retracted position wherein the stop member is below an upper surface of the part conveyor.

8 Claims, 4 Drawing Sheets

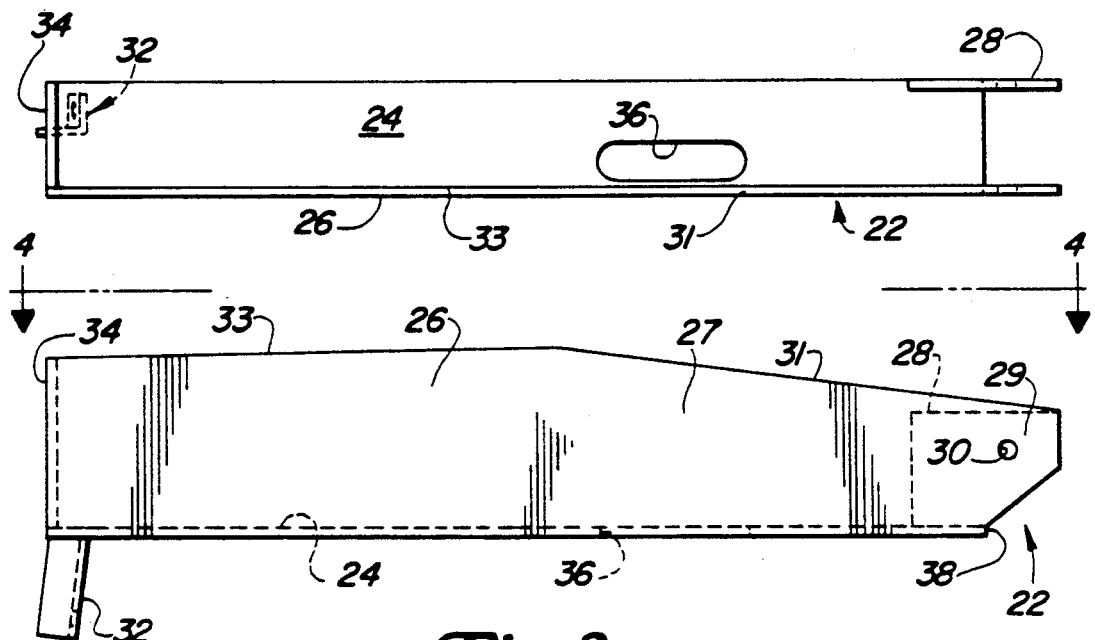
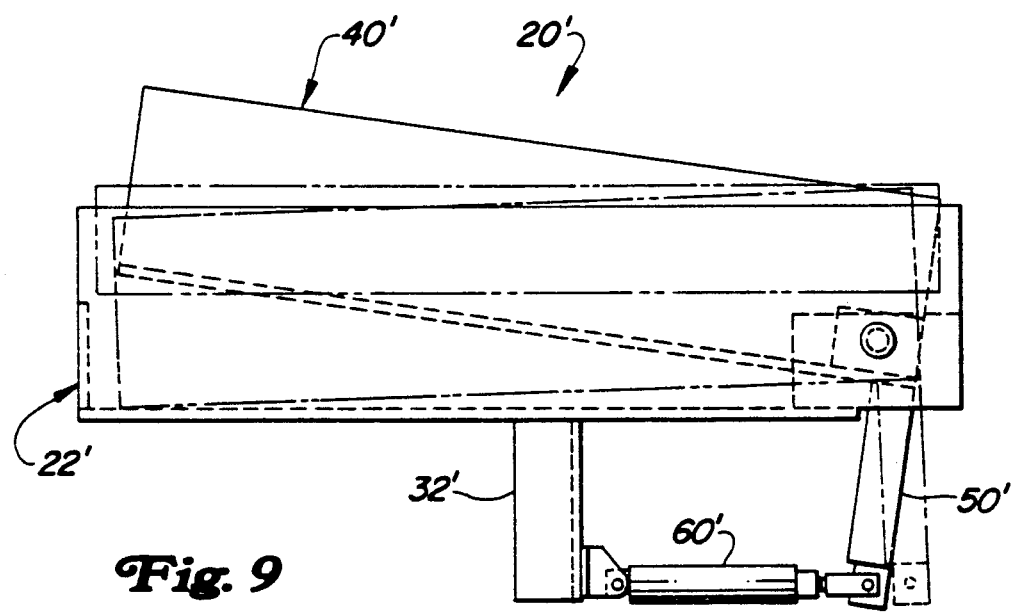

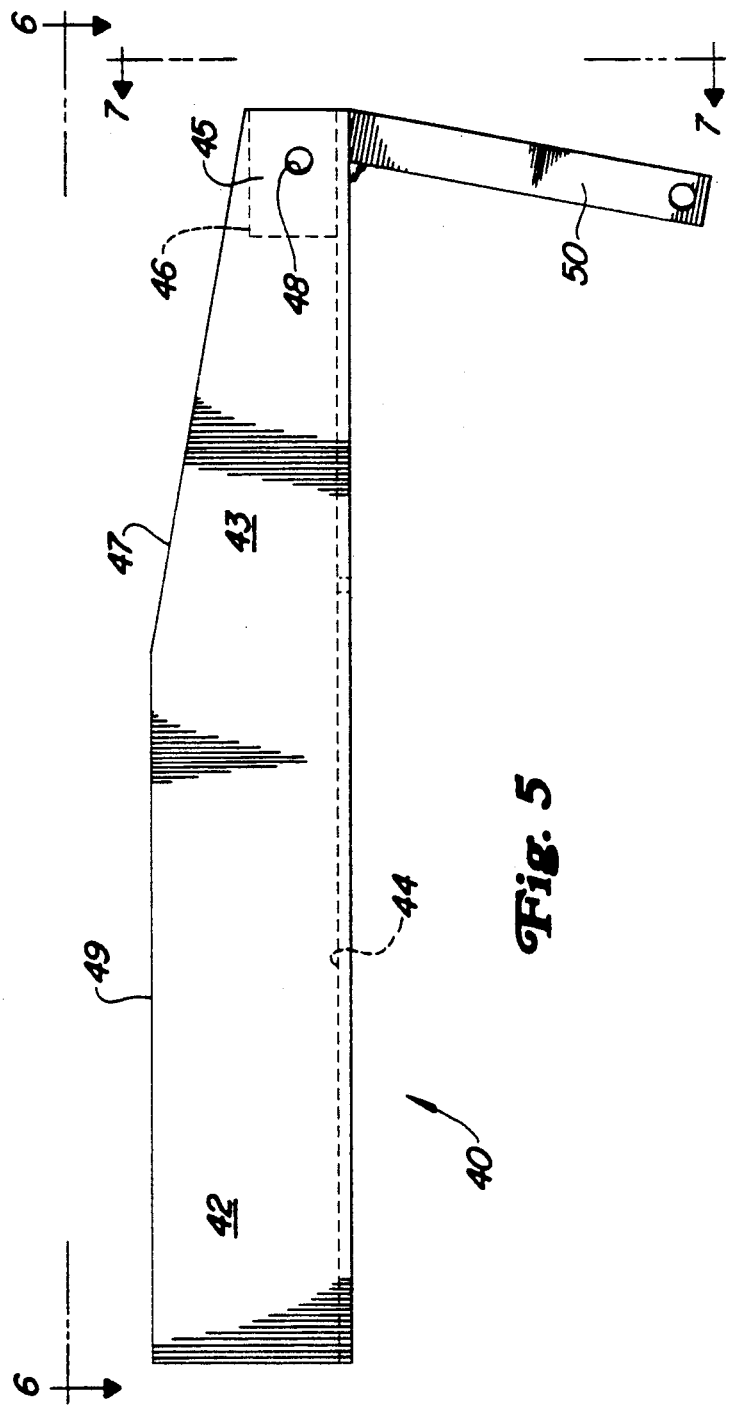

CONVEYOR BLADE STOP DEVICE

BACKGROUND OF THE INVENTION

The invention relates to a blade stop device and, in particular, to a blade stop device for use in connection with a part conveyor apparatus having rollers which engage and movably support parts which are placed on the conveyor.

Often, stops must be put in various locations in a part conveyor to prevent the parts from dropping off of the conveyor, especially in moving sections of conveyors. Typically, these stops are operated manually, electrically, or pneumatically. Manual mechanical stops are labor intensive. Electrically controlled stops have high initial cost, pose a possible electrocution hazard, and present difficulties in getting electrical power to a moving conveyor section while maintaining access to all sides of the conveyor section. Pneumatically controlled stops have problems similar to those of electrically controlled stops except that there is no electrocution hazard.

SUMMARY OF THE INVENTION

An object of the invention is to provide an inexpensive and quick acting blade stop device.

Another object of the invention is to provide a blade stop device which operates automatically, but which does not require electrical or pneumatic actuators.

These and other objects of the invention are achieved by the present invention wherein a blade stop device includes a pair of identical blade stop devices which are attached to the sides of a part conveyor. Each blade stop device includes a fixed frame member and a stop member pivotally coupled to and supported by the frame member. The stop member is normally held by a spring in a stop position wherein it projects above the upper surface of the part conveyor. A cable/actuator mechanism is operable to pivot the stop member to a retracted position wherein the stop member is below an upper surface of the part conveyor.

BRIEF DESCRIPTION OF THE DRAWINGS

FIG. 3 is a side view of a frame member of the present invention.

FIG. 4 is a view along lines 4—4 of FIG. 3.

FIG. 5 is a side view of a stop member of the present invention.

FIG. 6 is a view along lines 6—6 of FIG. 5.

FIG. 7 is a view along lines 7—7 of FIG. 5.

FIG. 9 is a side view of an alternate embodiment of the present invention.

DETAILED DESCRIPTION

Figure 1:
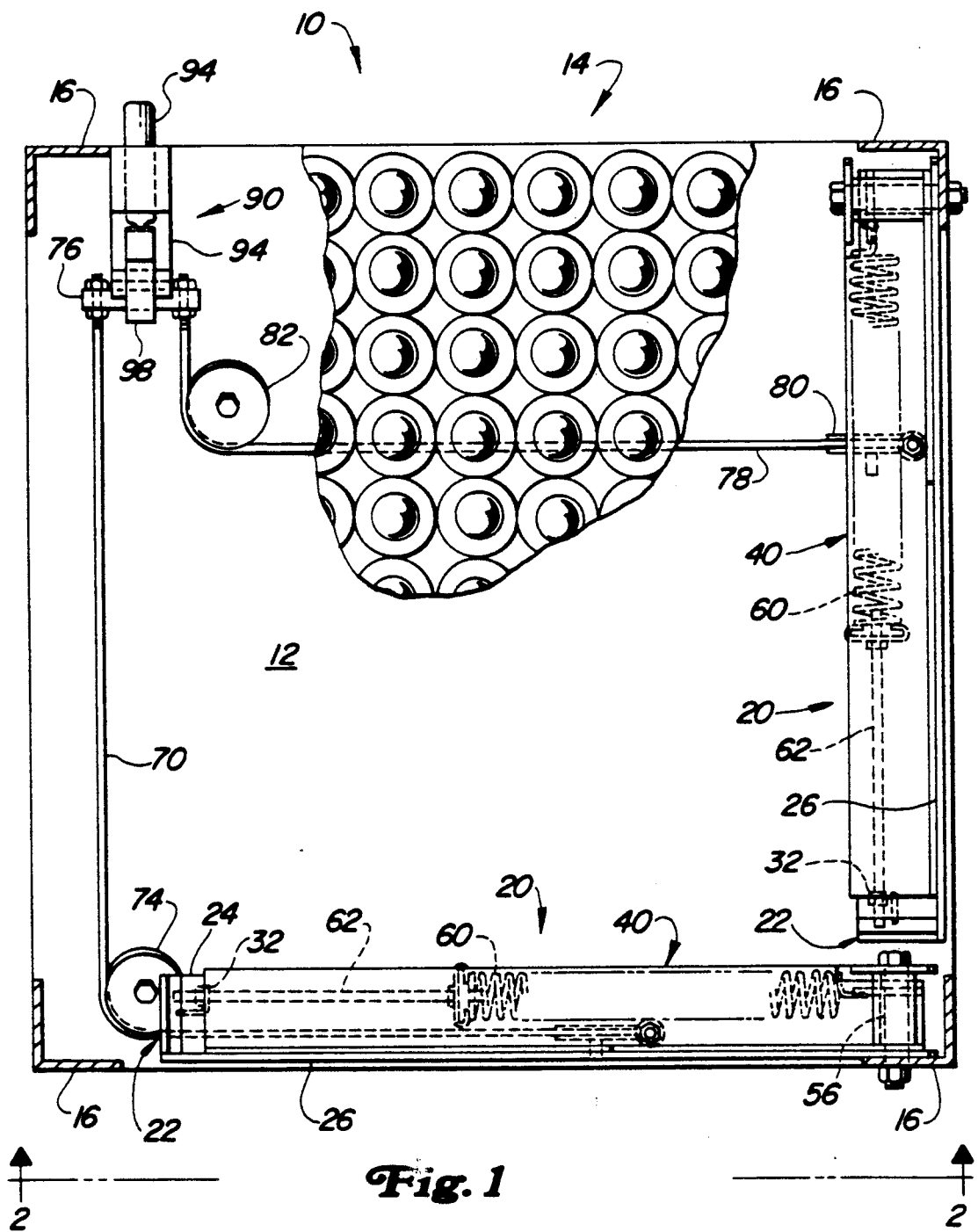
FIG. 1 is a top view of a part conveyor on which is installed a pair of blade stop devices according to the present invention.

Referring first to FIG. 1, a part conveyor 10, which may be a movable cart, includes a base 12 and a bed of rollers 14 supported above the base 12 by columns 16. The bed of rollers 14 support a part 18 to be moved across and by the conveyor 10. According to the present invention, at least one and preferably a pair of identical blade stop devices 20 are attached between the upper ends of adjacent pairs of the columns 16.

Referring now to FIGS. 1, 2, 3 and 4, each blade stop device 20 includes a generally L-shaped frame member 22 with a generally horizontally extending base 24 and generally vertically extending side 26. Opposite ends of the frame member 22 are fixed, such as by welding, to the columns 16. The side 26 has a portion 27 which tapers down to a small end 29 and which defines a surface 31 which is slanted with respect to surface 33. At one end of the base 24 a tab 28 extends upwardly in spaced parallel relationship to the side 26. A bore 30 extends horizontally through the tab 28 and the side 26. An arm 32 with an L-shaped cross section projects generally downwardly from the other end of the frame member 22 and the base 24 and the side 26 are joined by an end plate 34. An aperture 36 extends through the base 24. As best seen in FIG. 4, the side 26 and the tab 28 extend beyond or overhang an end 38 of the base 24.

Referring now to FIGS. 2, 5, 6 and 7, each blade stop device 20 includes a generally L-shaped stop member 40 with a generally vertically extending side 42 and a base 44 extending perpendicularly from the side 42. The side 42 has a portion 43 which tapers down to a small end 45 and which defines a surface 47 which is slanted with respect to surface 49. At one end of the base 44 a tab 46 extends upwardly in spaced parallel relationship to the side 42. A bore 48 extends horizontally through the tab 46 and the side 42. A lever arm 50 projects generally downwardly from this end of the base 44.

Figure 2:
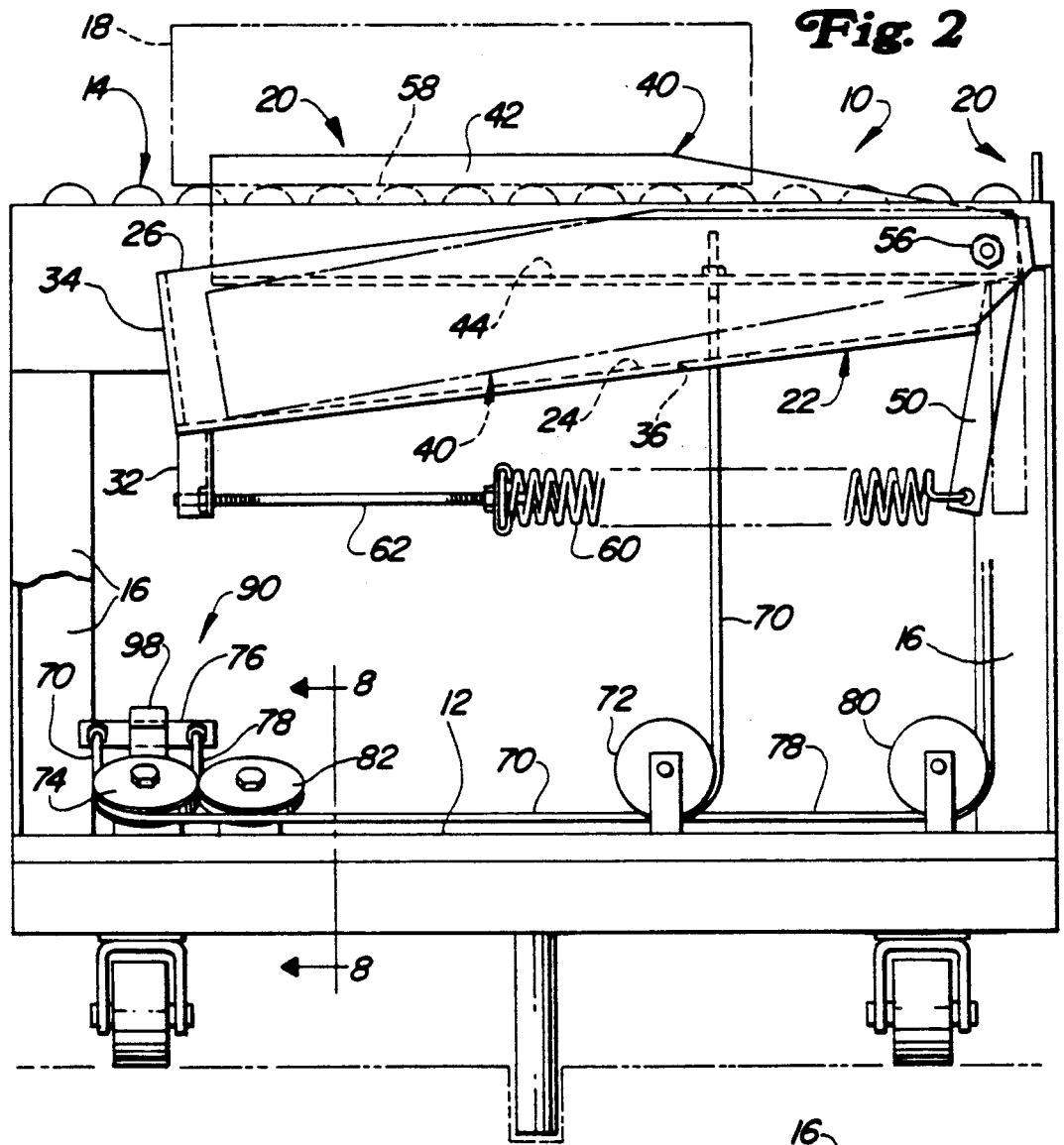
FIG. 2 is a side view of a part conveyor with the blade stop devices of the present invention.

As best seen in FIG. 2, the stop member 40 is pivotally coupled to the frame member 22 by a pivot pin 56 so that the stop member 40 can pivot about the axis of pin 56 between a retracted position wherein the stop member 40 is below a plane 58 defined by the upper surfaces of the rollers 14 and a stop position wherein the stop member 40 projects above the plane 58. A spring 60 has one end coupled to the end of lever arm 50. The other end of spring 60 is coupled to the end of arm 32 by threaded rod 62. The spring 60 is biassed to pivot the stop member 40 to its stop position.

Figure 8:
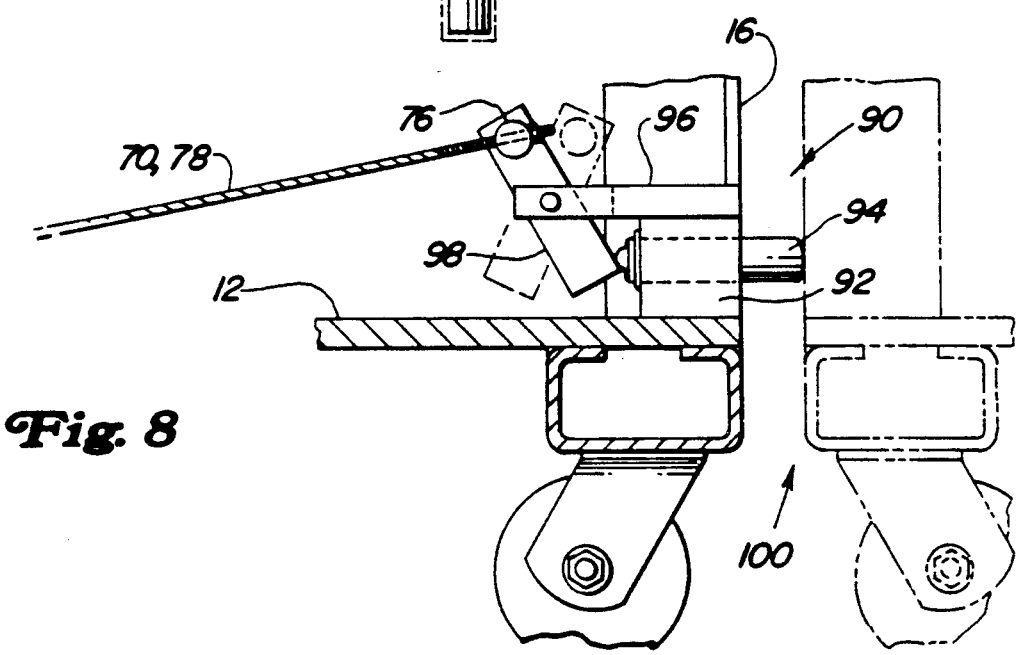
FIG. 8 is a view along lines 8—8 of FIG. 2.

As best seen in FIGS. 1, 2 and 8, a cable/actuator mechanism is operable to move the stop members 40 to their retracted positions. A cable 70 extends through the aperture 36 and has an end which is adjustably attached to the base 44 of one of the stop members 40. The cable 70 extends down to and is bent around pulley 72, from where it extends horizontally to a pulley 74, from where it extends horizontally to a pull bar 76 of plunger actuator 90. The other stop member is coupled to the pull bar 76 via cable 78 which bends around pulleys 80 and 82.

The actuator 90 includes a housing 92 which is fixed to the base 12. A bore in the housing slidably receives a piston 94. An arm 96 projects from the housing 92 and pivotally supports a lever 98. When the piston 94 is depressed, it pivots the lever 98 and moves the pull bar 76, thus pulling both cables 70 and 78 and pivoting both stop members 40 to their retracted positions. The actuator is preferably mounted on the part conveyor 10 so that, when the part conveyor 10 is moved into position adjacent another conveyor 100, or when another conveyor 100 is moved into position adjacent the part conveyor 10, the piston 94 will engage and be depressed by the other conveyor 100 and cause the stop members 40 to be automatically moved to their retracted positions so that the part 18 can be moved to the other conveyor 100. It will be apparent that the arrangement of cables and pulleys can be modified so that the actuator 90 can be positioned at any side of the part conveyor 10. Alternatively, it will be apparent that the cables could be connected to a foot pedal (not shown) instead of the actuator 90.

Referring now to FIG. 9, an alternate embodiment blade stop device 20' includes a two-way air cylinder 60' which is connected between arm 32' which extends from the frame member 22' and arm 50' which extends from stop member 40'. With such an arrangement, the stop member 40' can be actuated by remote control or by cams coupled to pneumatic control valves (not shown).

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A blade stop device for a part conveyor having a plurality of rollers for supporting a part to be conveyed, the blade stop device comprising:
   a frame member attached to a frame of the conveyor;
   a stop member pivotally supported by and coupled to the frame member, the stop member being pivotal between a retracted position wherein the stop member is below a plane defined by upper surfaces of the rollers and a stop position wherein the stop member projects above said plane;
   an actuator coupled to the stop member and operable to move the stop member to its retracted position;
   a first arm projecting from the stop member;
   a second arm projecting from the frame member; and
   a spring member coupled between the first arm and the second arm and biased to urge the stop member to its stop position above the plane.

2. The blade stop device of claim 1, wherein:
   the actuator is coupled to the stop member by a cable which is bent around at least one pulley.

3. The blade stop device of claim 2, wherein the actuator comprises:
   a housing fixed to the conveyor frame;
   a pull bar attached to the cable;
   a lever pivotally supported by the housing; and
   a piston slidable in a bore in the housing and engaging the lever, movement of the piston pivoting the lever, moving the pull bar and pulling the cable so that the cable pivots the stop member to its retracted position.

4. The blade stop device of claim 1, wherein:
   a pair of blade stop devices are mounted on adjacent sides of the part conveyor;
   a first cable couples one of the pair of blade stop devices to the actuator; and
   a second cable couples the other of the pair of blade stop devices to the actuator.

5. The blade stop device of claim 1, wherein:
   the actuator is mounted on the frame of the part conveyor so as to be engageable with another part conveyor, engagement of the other part conveyor with the actuator causing the actuator to move the stop member to its retracted position.

6. A blade stop device for a part conveyor having a plurality of rollers for supporting a part to be conveyed, the blade stop device comprising:
   a frame member attached to a frame of the conveyor;
   a stop member pivotally supported by and coupled to the frame member, the stop member being pivotal between a retracted position wherein the stop member is below a plane defined by upper surfaces of the rollers and a stop position wherein the stop member projects above said plane; and
   an actuator coupled to the stop member by a cable which is bent around at least one pulley, the actuator being operable to move the stop member to its retracted position.

7. A blade stop device for a part conveyor having a plurality of rollers for supporting a part to be conveyed, the blade stop device comprising:
   a frame member attached to a frame of the conveyor;
   a pair of stop members mounted on adjacent sides of the part conveyor, each stop member being pivotally supported by and coupled to the frame member, each stop member being pivotal between a retracted position wherein the stop member is below a plane defined by upper surfaces of the rollers and a stop position wherein the stop member projects above said plane; and
   an actuator coupled to each stop member and operable to move each stop member to its retracted position, a first cable coupling one of the stop members to the actuator, and a second cable coupling the other stop member to the actuator.

8. A blade stop device for a part conveyor having a plurality of rollers for supporting a part to be conveyed, the blade stop device comprising:
   a frame member attached to a frame of the conveyor;
   a stop member pivotally supported by and coupled to the frame member, the stop member being pivotal between a retracted position wherein the stop member is below a plane defined by upper surfaces of the rollers and a stop position wherein the stop member projects above said plane; and
   an actuator coupled to the stop member and operable to move the stop member to its retracted position, the actuator being mounted on the frame of the part conveyor so as to be engageable with another part conveyor, engagement of the other part conveyor with the actuator causing the actuator to move the stop member to its retracted position.

* * * * *